United States Patent

[11] 3,581,000

[72] Inventors Richard C. Hansen
Penfield;
Charles J. Mahler, Fairport; Nicholas M. Soures, Webster; Thomas L. Stickney, Rochester, all of, N.Y.
[21] Appl. No. 765,538
[22] Filed Oct. 7, 1968
[45] Patented May 25, 1971
[73] Assignee Xerox Corporation
Rochester, N.Y.

[54] INCREMENTAL STEPPING PAPER DRIVE
11 Claims, 6 Drawing Figs.

[52] U.S. Cl. ........ 178/7.6, 178/6, 271/51
[51] Int. Cl. ........ H04n 1/22, B65h 5/06
[50] Field of Search ........ 271/51, 45, 3, 4, 10

[56] References Cited
UNITED STATES PATENTS

| | | | |
|---|---|---|---|
| 2,566,927 | 9/1951 | Carroll et al. | 271/51X |
| 2,816,160 | 12/1957 | Young | 271/45X |
| 3,027,068 | 3/1962 | Iwai et al. | 271/51X |

*Primary Examiner*—Joseph Wegbreit
*Attorneys*—Paul M. Enlow, Ronald Zibelli, James J. Ralabate, Norman E. Schrader and Franklyn C. Weiss

ABSTRACT: An incremental stepping paper drive assembly for advancing a document or the like past a scanning station in a facsimile communication system. In combination with a binary digit encoder and buffer storage unit, the incremental stepping paper drive assembly is activated and interrupted in accordance with the amount of information detected, encoded and stored in order to maintain maximum information transmission over a limited bandwidth transmission medium.

PATENTED MAY 25 1971 3,581,000

INVENTORS
RICHARD C. HANSEN
CHARLES J. MAHLER
NICHOLAS M. SOURES
BY THOMAS L. STICKNEY

Franklyn C. Weiss
ATTORNEY

INCREMENTAL STEPPING PAPER DRIVE

BACKGROUND

In prior art facsimile systems, documents to be transmitted are scanned at a transmitting station to convert information on the document into a series of electrical signals. These video signals are then coupled to the input of the communication link interconnecting a transmitter with a receiver. At a receiving station, video signals, in conjunction with suitable synchronizing signals, selectively control the actuation of appropriate marking means to generate a facsimile of the document transmitted.

In such a facsimile system, quick and accurate service, as well as low cost operation, is desirable. To achieve low cost but rapid transmission service has been, in the past, difficult as the system required a large bandwidth capability transmission medium in order to maintain picture resolution and signal quality at a high level. The main drawback, therefore, to such prior art devices has been the prohibitively high rental cost of the use of the transmission medium used to transmit the large signal densities. Without the use of the high capacity transmission medium, the document transmission time increases or, alternatively, the number of documents per unit time transmitted decreases, accordingly. It is apparent, therefore, that the high cost of such transmission line service, or increase in document transmission time, becomes a serious limitation on the economic usefulness of the facsimile equipment.

It is, accordingly, apparent that with the high cost of the transmission medium, that such transmission medium be used at its maximum bandwidth capability in order to maintain a high overall system efficiency. Inasmuch as document complexity differs from document to document, the online or direct transmission of the information as detected on the document would not utilize the transmission medium to its fullest capabilities as documents contain a large amount of redundant or background information. To overcome these difficulties, prior art facsimile systems have included bandwidth compression or encoding techniques to reduce such information to coded digital words to decrease the amount of actual binary digits necessary for transmission. Even with such bandwidth compression techniques, however, the transmission medium may still not be used to its fullest capacity in that different scan lines on a document would compress, or encode, differently as such lines contain different amounts of information. For instance, one particular scan line could contain an inordinately high amount of information as a scan through a typewritten line, while another scan may contain little or no information as between lines or paragraphs and at the top or bottom of a typical document.

One prior art technique of overcoming the above difficulties is the use of a controlled cathode ray tube beam used for scanning in a facsimile system and counting the encoded words prior to loading a buffer storage unit. See U.S. Pat. No. 3,344,231, issued Sept. 26, 1967. The use of cathode ray tubes as facsimile scanning devices necessarily implies a high volume and attendant high cost facsimile communication system. The use of a cathode ray tube with its high scan rate capabilities may be justified in a high cost, high volume system where the revenue obtained due to such high volume overcomes the initial cost of the tube. In addition, the use of cathode ray tubes do not lend themselves to use in facsimile transceivers wherein a unit would be capable of both transmitting and receiving in its associated modes. In a low cost system, wherein the transmission medium may be an ordinary common carrier telephone line, cathode ray tubes and associated deflection and power circuitry could not be economically justified.

OBJECTS OF THE INVENTION

It is, accordingly, an object of the present invention to optimize the information handling capability in a facsimile communication system.

It is another object of the present invention to maximize the information transmission capability required of a transmission medium in a facsimile communication system.

It is another object of the present invention to control the document speed past a scanning station in a low cost facsimile system.

It is another object of the present invention to provide a coordinated scanner, paper feed, and buffer storage unit in a facsimile communication system to optimize the information transmission rate therein.

It is another object of the present invention to provide an improved incremental stepping paper drive system in a facsimile communication system.

It is another object of the present invention to provide synchronization between scanning and storing of facsimile information for both transmitting and receiving in a facsimile communication transceiver.

It is another object of the present invention to provide a continuous or incremental paper drive in a teeter-totter arrangement.

BRIEF SUMMARY OF THE INVENTION

In accomplishing the above and other desired aspects, Applicant has invented novel methods and apparatus for controlling the scan operation in accordance with transmitted or received binary information in a facsimile communication system. A stepping paper drive assembly is disclosed and described for use in advancing a document or copy paper through a scan area of a facsimile transceiver. A teeter-totter arrangement is disclosed wherein a high speed driving means with driving wheels on one end and idler wheels on the other pivots around a rotation axis. A document or the like would be brought at a high speed by the driving wheels to the scan area wherein the teeter-totter would be shifted to bring the idler wheels into contact with an incremental stepping paper drive assembly. The document now moves at incremental steps past the scan station for optically scanning and printing in the transmit or receive modes respectively.

The video signals detected by a photodetection apparatus in the scanner is converted to digital information and transferred to a bandwidth compression unit or encoder for reducing the redundancy in the digital wavetrain. The encoded binary information is then fed into a buffer storage unit which is used to temporarily store the video information prior to transmission. In order to optimize the transmission of the video information and to approach the bandwidth capability of the transmission medium itself, the buffer storage unit unloads the video information at the rate compatible with the bandwidth of the transmission medium. Inasmuch as lines on a document compress to different amounts, the information into the buffer may approach the limit of the storage therein. In this instance, the stepping paper feed is interrupted, rather than interrupting the scanning operation, and no more information is encoded and transferred to the buffer storage unit until monitoring circuits detect that the buffer can receive more information. At this time the stepping paper feed is actuated and the scanning, encoding, and storing operations continue. This operation works in the receive mode also inasmuch as the apparatus is intended for a transceiver unit which allows for transmitting and receiving with the use of the same apparatus. Thus, in the transmit mode, when the buffer storage unit is receiving information at a rate which loads the buffer to its maximum limit, the scanning operation is interrupted until the buffer unloads the information to allow more input information to be stored therein. In the receive mode, loading is not interrupted but unloading is interrupted until sufficient information is in storage to allow printing of a line.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
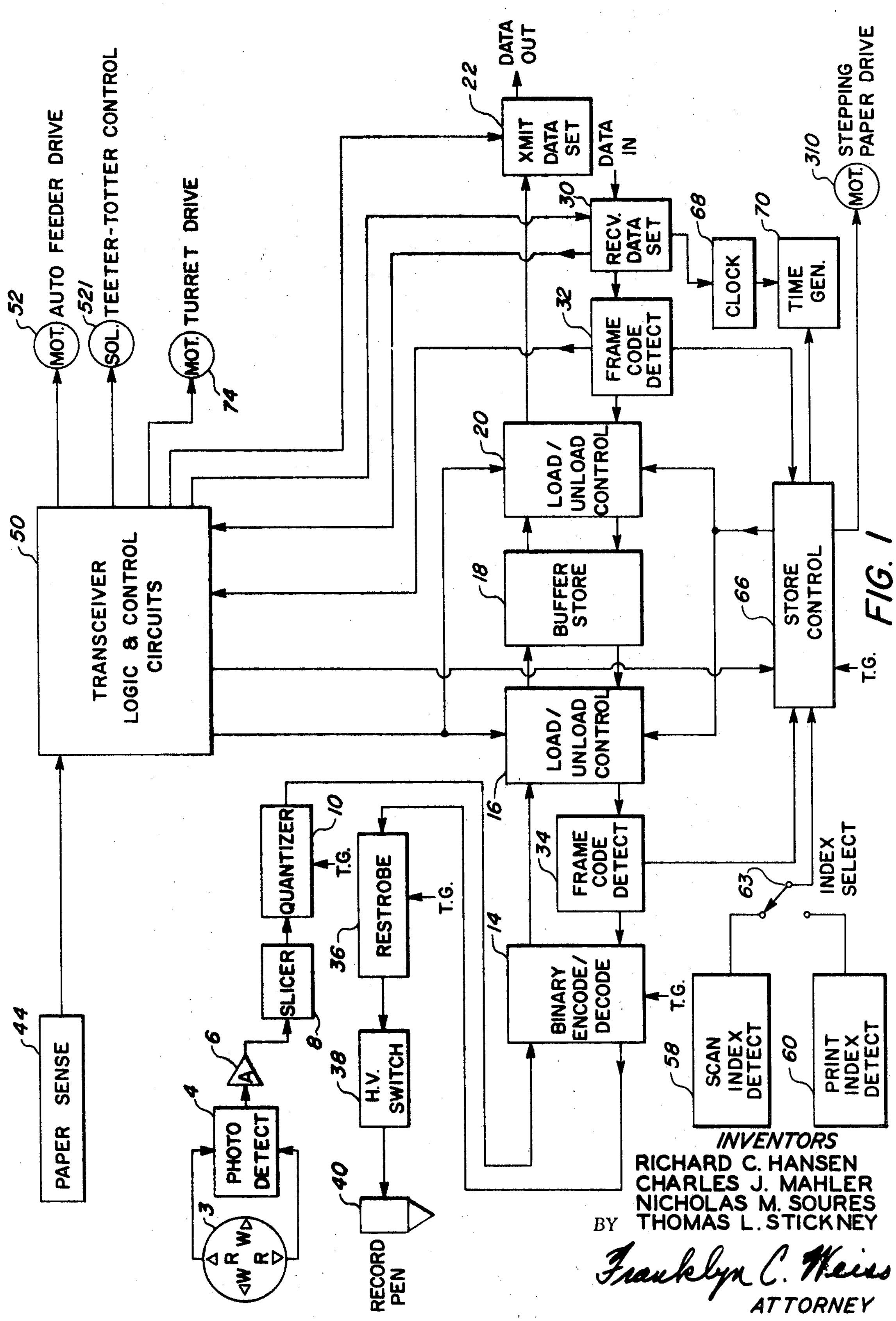
FIG. 1 is a block diagram of the electrical apparatus included in the facsimile transceiver employing the principles of the present invention.

Referring now to FIG. 1, there is shown a block diagram of a facsimile transceiver utilizing the principles of the present invention essentially as set forth in copending application Ser. No. 572,493, assigned to the same assignee as the present application. The electrical aspect of the facsimile transceiver in the copending and present application is fully set forth in application Ser. No. 572,493. However, for full understanding of the invention set forth in the present application, certain aspects of the electrical operation of the facsimile transceiver will be described in order to more fully understand the present invention.

A transceiver may be defined as the combination of facsimile transmitting and receiving equipment in a common housing and employing common components for both transmitting and receiving, certain components being utilized both in a transmit mode and receiving mode. That is, when in this specification the discussion alludes to transmit and receive transceivers, it will be seen that similar transceivers are being utilized, with one in the transmit mode and the other in the receive mode.

In the prior art facsimile systems, a document was advanced past a scanning station by rollers or other feeding devices. In the present application stepping paper drive motor 76 is utilized to step the document past the scanning station 3. While many scanners are available in the art, a turret type of scanner is preferred, driven by turret drive motor 74 wherein two optical read heads are provided 180° apart on a rotating disc or the like. For printing purposes in the transceiver, two write heads are also provided on the same rotating disc with 180° separation, placed in 90° relationship with the two read heads. The derived information modulated light beam is converted to electrical signals by photodetector 4, of conventional design. The electrical signals derived therefrom are then amplified at video amplifier 6 for application to slicer 8. The slicer 8, which may be a conventional Schmitt trigger, compares the electrical signals with a known electrical potential to convert the electrical signals into discrete signal levels indicating black or white information detected on the document. The derived sliced electrical signals are then applied to quantizer 10, of conventional design, to bring these signals into a time relation with a clock signal provided by time generator 70. The output signals from quantizer 10 are now binary signals quantized into time relation for further circuit operation. The time generator 70 is responsive to clock source 68, both of conventional design, and supplies the various clock pulses required for a synchronous operation of the circuit.

A principle application of facsimile equipment is the transmission of printed or typewritten documents or letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. Such signal inefficiency inherent in facsimile output waveforms, due to the fact that the waveform comprises two-level binary information and the attendant long periods of little or no information transmission, have lead to the development of various encoding techniques to reduce such inefficiency, thereby eliminating the wasted transmission time.

There is provided, therefore, a bandwidth compression circuit 14 for encoding the detected facsimile waveform. Binary encoder-decoder 14 is utilized for encoding and decoding the binary information when in the transmit or receive mode, respectively. The input to the encoder in the transmit mode is the quantized binary video signal representing black and white areas of information on the original document. The binary waveform is encoded to improve the efficiency by the generation of code words representative of the lengths of black or data, and white or background redundant information. One such encoding technique is known as run length encoding in which binary numbers corresponding to the length of blocks of binary data are transmitted rather than the usual binary data signals. In such a system, a binary number of relatively few binary digits may be sent in lieu of a larger block of video binary data. For a more complete understanding of run length encoding, reference is made to U.S. Pat. No. 3,035,121 to W. F. Schrieber, issued May 15, 1962.

The binary video information is received at the encoder 14 from the scanning and digitizing circuits at a rate higher than the transmission capability of the communication channel. Such an increased scan rate is due to the fact that the purpose of the bandwidth compression circuit is to reduce the inherent redundancy of pictorial material without the loss of information, and to transmit the resultant encoded data with a substantial reduction in required bandwidth time product. Since the bandwidth of the channels under consideration is restricted, increasing the efficiency of the data decreases the time of transmission. In order to optimize the bandwidth transmission capability of the channel, therefore, the information should be transmitted at a rate approaching its bandwidth capability. As no two documents to be scanned are alike, the time for transmission and associated binary digit transmission rate can only be approximated within a certain error percentage.

Load-unload control 16 will receive the encoded binary information from encoder 14 and will transfer such information to the buffer storage unit 18. As the load-unload control 20 is unloading the buffer storage unit 18 at the transmission rate, at times the scan information will be reaching the buffer store 18 at too fast an input rate. In this instance, therefore, the load-unload control 16, in a manner to be more fully hereinafter described, will emit a signal to interrupt the scanner operation until the buffer store 18 is sufficiently devoid of information to allow further scanning.

Transmitted along with the encoded binary information is a unique sync word to delineate the separate scan lines. A sync word is unique in the sense that the particular combination of binary digits comprising such a sync word could not, by definition, appear in the output encoded waveform. Such a sync word is inserted into the information wave stream at the load-unload control 20 by means of the scan index detector 58. Such a scan detector could be any of the known scan detection devices, which for example, could comprise a photoelectrical cell, not shown, adjacently disposed to the scan read turret arrangement. A similar print index detector 60, also not shown, is provided for the receive mode, being selected by index selector 63. The derived signal therefrom would then be applied to store control 66, the operation of which will be more fully hereinafter described.

After the encoding and storing operations, the encoded waveform must be prepared for transmission to a similar transceiver unit at the remote location. Therefore, at the input and output ends of the transmission medium are circuits for providing compatibility between the transmitter and receiver circuits and the transmission medium. These circuits, commonly called data sets, provide impedance matching and power amplification and/or modulating apparatus. Such data sets may, for example, comprise a conventional line driver, radio transmission unit, and the like. As fully set forth in copending application Ser. No. 572,493, acoustic coupling may be utilized for mobility and simplicity in the use of a conventional telephone handset. It is, of course, possible to utilize direct electronic coupling to the transmission medium.

In the receive mode, the two-level binary signals derived from the receiver data set 30 are then applied to the frame code detector 32. This unit is utilized to detect the unique sync word that was inserted in the binary wave train at the transmitting transceiver. Upon detection of the sync word, the store control 66, which is essentially a counter, is energized and advanced one count. Such a frame code detector 32 may comprise logical flip-flop circuitry which is wired to detect the particular configuration of the unique sync word utilized. The output information from the frame code detector 32 is then passed onto load-unload control 20 which, as described in conjunction with the transmit function of the transceiver, is used to load the buffer store 18 with the binary encoded information. Load-unload control 16 draws the information from the buffer store 18 at a rate to be utilized by the output printer unit. As the information is unloaded from the buffer store through the load-unload control 16, another frame code detector 34 will detect the same unique sync word as was detected at frame code detector 32.

Upon detection of the sync word at 34, a signal is used to count down the store control 66. The counting up and counting down operation is utilized so that the store control 66 will be able to detect the number of lines stored at the buffer store 18. That is, for example, if three lines of information have been stored at the buffer store 18, frame code detector 32 would have detected three sync words. Thus, store control 66 would have been advanced three counts, one for each of the detected input sync words. As the information is unloaded from the store, frame code detector 34 emits a signal to count down the store control 66 such that the first line output would indicate that two lines of information remain stored in the buffer store 18. As was hereinbefore set forth, the stepping paper drive motor 76 is energized by the condition indicated at the store control 66 to advance the document paper through the transceiver.

After buffer storage, the binary encoded information is directed to the binary decoder 14. This decoder, in a manner similar to the encoder operation described for the transmit mode, reconstructs the signal waveform with its associated redundancy.

A restrobe unit 36 is provided to retime the output binary information to a condition that can be applied to an output printer. If, for example, an electrographic printer is utilized, the output from the restrobe unit 36 is used to energize a high voltage switch 38, of conventional design, operating at a predetermined operating potential. The output from the high voltage switch 38 is coupled to the recording pen on the rotating turret 3, indicated as the write heads. As the turret revolves and scans across the copy or record paper, the high voltage potential is selectively applied to form an invisible or latent electrographic image on the output paper document. As the recording medium passes by the write station, prior art xerographic toner and developer may be used to develop the image on the recording medium which is then fused for permanent retention of the facsimile document. A facsimile of the original document would now be available in an output tray or the like for viewing and inspection.

Additionally coupled to the transceiver logic and control circuit 50 are the paper sense units 44, the automatic paper feeder drive 52, the teeter-totter control 53, necessary for the operation of the present invention. Thus, in a manner to be more fully hereinafter described in conjunction with the actual mechanical stepping paper drive apparatus, the paper sense units sense the position of the document or copy paper throughout the unit by means of microswitches or photoelectric cells, for example. The paper sense units, therefore, monitor the path of document or copy paper movement throughout the transceiver and energize accordingly the proper apparatus for correct synchronization and machine apparatus operation. Thus, for example, upon proper paper sense information, the automatic feeder drive moves an original document or copy paper, in the transmit or receive modes respectively, into the scan area. Once the document or copy paper is in the scanning area, stepping paper drive 76 in conjunction with the operation of teeter-totter control 521 steps the document or copy paper through the scan area and past the turret 3, which is controlled by turret drive motor 74. After the document is past the scan area, motor drive 360, in a manner more fully hereinafter described, is energized and moves the document quickly away from the scan area.

It is noted, in FIG. 1, that the drive motors are under control of the transceiver logic and control circuit 50, with the exception of stepping paper drive 76. Thus, in the transmit mode, as the original document is scanned, the information is encoded by encoder 14 and by load-unload control 16 is stored in buffer store 18. Since the transmitting medium can only handle a predetermined maximum amount of binary information before distortion occurs, the encoded information for particular scan or scans might be reaching the buffer store 18 at a rate too fast to allow for sufficient transmission time. To state it in another way, the encoded information might be loading the buffer store 18 faster than the transmitter data set 22 through load-unload control 20 is unloading the buffer store 18 for transmission. In this instance, therefore, store control 66 by monitoring the amount of information in the buffer store 18 interrupts the operation of stepping paper drive motor 76 thereby halting the paper movement through the scan area. Since the turret 3 has a high inertia, it is allowed to maintain its rotation speed, the transceiver logic and control circuit 50 indicating to the electronic digital circuits to ignore the information being generated by the photodetector 4 until the store detector 66 through drive motor 76 allows the paper drive through the scan area to commence once again.

In the receive mode, in a similar manner, store control 66 controls the stepping paper drive motor 76 as the document proceeds past the scan area in the write mode. Thus, if the received information is complex and a longer time is necessary for decoding the information, the turret 3 will be caused to continually scan one line with no writing taking place, as stepping drive motor 76 is deenergized until store control 66 indicates that buffer store 18 can provide more information. In this way, in both the transmitting and receiving modes, the system is fully adaptive in that no information is lost due to the fact that the electronics involved, with a possible complex document, will not lose any information due to the operating speed of the system. Document integrity is therefore preserved, thereby allowing a more accurate and readable output facsimile document.

Figure 2:
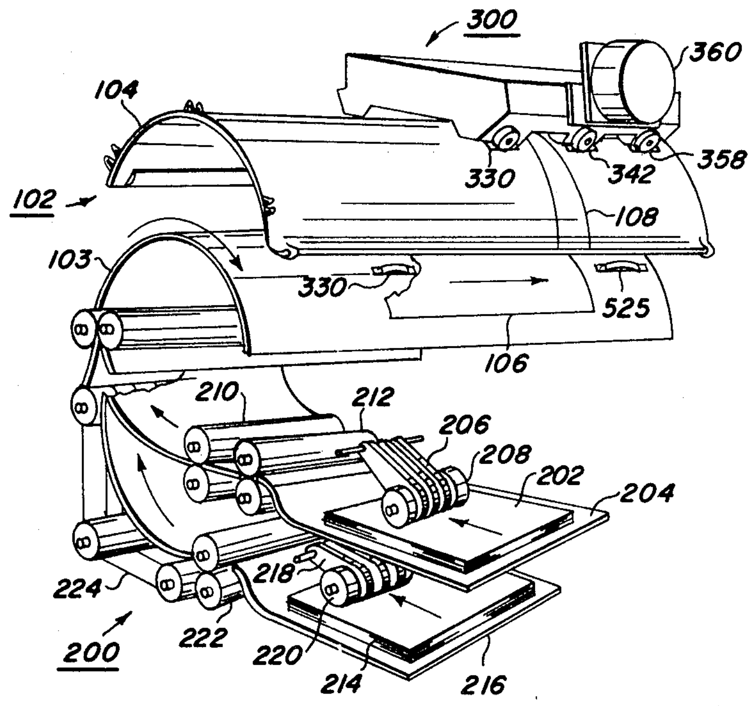
FIG. 2 is an isometric drawing showing the automatic document feeder, platen assembly and incremental stepping paper drive of the facsimile transceiver.

In FIG. 2 is shown the automatic document feeder drive assembly 200, the stepping paper drive assembly 300, and the input document curved platen assembly 102. The mechanical aspects of the invention disclosed in FIG. 2, in conjunction with the electrical system described in conjunction with FIG. 1, perform the substance of the present invention in the advancing and stepping of a document or copy paper through a scan area. Subsequent paper unloading, developing and paper feed out apparatus is not shown in the present invention in that it is a basis of another copending application Ser. No. 758,932, assigned to the same assignee. In particular, FIG. 2 shows a stack of original documents 202 resting on an input tray 204. Upon proper command from the transceiver logic and control circuit 50, seen in FIG. 1, the paper feeding assembly 206 grips a document by rollers 208 and begins to feed a document at a time through roller assemblies 210 and 212 into the platen assembly 102. In a similar manner, in the receive mode, a blank sheet of record or copy paper in a stack 214 on tray 216 is advanced by paper drive assembly 218 by the advancing of the wheels 220 mounted thereon by feeding the paper through roller assembly 222 into the platen assembly 102. Seen in the figure are belt drives 224 which hold the paper against the tray 216 as the copy paper is advanced up into the platen area. For a more complete understanding of the automatic document feeder, reference is made to copending application Ser. No. 711,747, assigned to the same assignee.

The automatic document feeder assembly 200 is shown to advance the document or copy paper into the platen area from a direction perpendicular to the longitudinal axis of the curved platen assembly 102. It is apparent, however, that an original or record document could be advanced from a direction along the axis of the platen 102 by a paper drive assembly along the axis thereof. The automatic feeder drive assembly 200 is, therefore, exemplary only as any paper feeder assembly, which would drive a document or record member onto the platen area, could be utilized without deviating from the principles of the present invention.

Platen 103 and platen 104 are shown apart for ease of illustration and description, but it is obvious that during the operation of the apparatus, these platens would be in close proximity to each other to effect accurate and rapid movement of the document through the scan area. Mounted on the top platen 104, is the stepping drive assembly 300. While the operation of the paper drive 300 is more fully hereinafter described, it can be seen that driving wheels 330, 342, and 358, extend through the platen 104 to come in contact with associated idler wheels. The associated idler wheel for drive wheels 330 and 342 are not seen in FIG. 2, as a document 106 is seen to be advancing through the scan area designated at 108. The idler wheel which operates in conjunction with drive wheel 330 is mounted on a teeter-totter assembly which is more fully described hereinafter in conjunction with FIGS. 5 and 6, and is withdrawn below the level of platen 103 when the document is advanced onto the platen area from the automatic paper feeder drive assembly 200. As soon as the document reaches the full position on platen 103 the teeter-totter assembly is energized and the wheel 330 rises through the opening in platen 103 thereby gripping the document by pressure against the upper platen 104 to drive the document longitudinally through the scan area. In other words, the paper feeder drive as shown in FIG. 2, automatically feeds a document or copy paper onto the platen area in a direction transverse to the axis of the platen assembly. After the document is detected to be in the proper position, the teeter-totter assembly is activated and the drive wheels associated therewith change the direction of movement of the document longitudinally along the axis of the platen 103. While FIG. 2 has been described with one set of drive wheels and associated idler wheels, it can be seen in FIGS. 3 to 6 that another set of drive and idler wheels operate on the other side of the curved platen.

After the document has passed the scan area 108 the drive wheel 358 and associated idler wheel 525 drive the document away from the scan area at a higher rate of speed than the stepping drive through the scan area. As set forth above, subsequent paper operations after it passes the scan area are not shown in the present application but it is the basis of copending U.S. application Ser. No. 758,932. As will be hereinafter more fully described, the positions of the paper through the paper drive, platen area, and scan area, are noted by paper sensing devices such as photoelectric cells, or microswitches. In order to minimize the possible damage to a thin document, microswitches are not used in the present invention, but instead are photoelectric cells and associated light sources, seen more fully hereinafter in FIG. 6.

Figure 3:
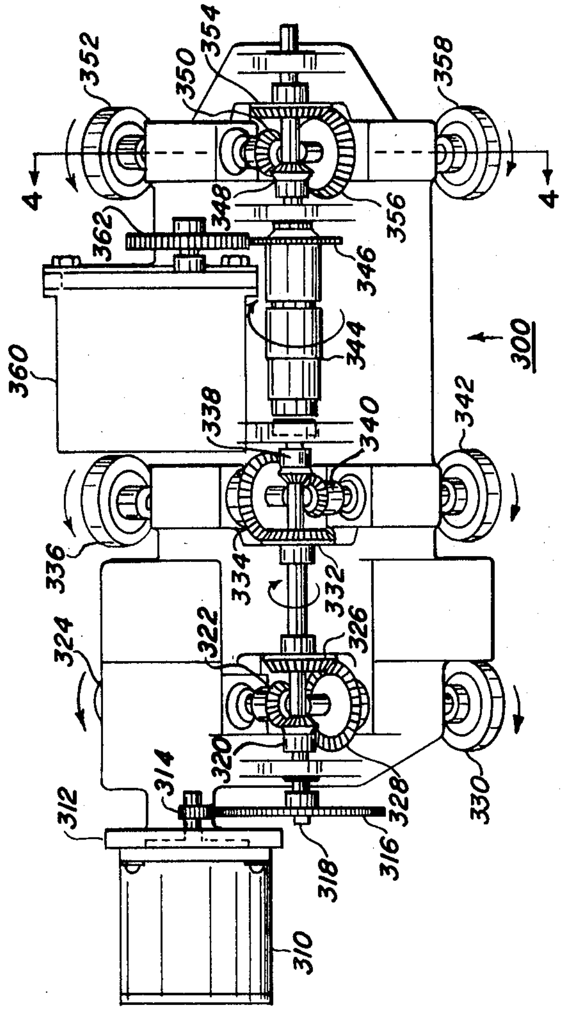
FIG. 3 is a top view of the incremental stepping paper drive of the present invention.

As can be seen in FIG. 3, the stepping drive assembly 300 is mounted on a support member 312. Stepping motor 310, also mounted to the support 312, turns gear 316 by means of gear 314 mounted on the motor shaft. As stepping motor 310 revolves in a counterclockwise motion, gear 316 will be revolving in a clockwise direction. The motion of gear 316 is transmitted through shaft 318 to gears 320 and 326. Gear 320 is coupled to gear 322 for driving the drive wheel 324, and gear 326 is coupled to gear 328 for driving drive wheel 330. The motion of gear 316 is also transmitted to gear 332 and

338. Gear 332 is coupled to gear 334 which drives drive wheel 336 in the direction shown. In a similar manner gear 338 drives gear 340 and thus drives drive wheel 342 connected thereto. The motion of the shaft 318 is coupled to gear 348 through coupling apparatus 344 and clutch arrangement 346. Thus, drive wheels 352 and 358 will be driven by means of gear 348 coupled to gear 350 and gear 354 coupled to gear 356.

When, however, it has been determined that the document had passed a predetermined position in the scanning process, continuous drive motor 360 is energized and through gear 362 drives gear 346. The direction of driving by motor 360 is in the same direction as the rotation of the shaft by stepping motor 310, but as the drive motor 360 turns at a speed faster than that of motor 310, the clutch arrangement allows a slipping motion to drive gear 346 faster than that being driven through coupling 344. This continuous drive action now continually drives wheels 352 and 358 at a rate faster than the stepping drive thereby driving the paper past this position at a rapid rate.

Figure 4:
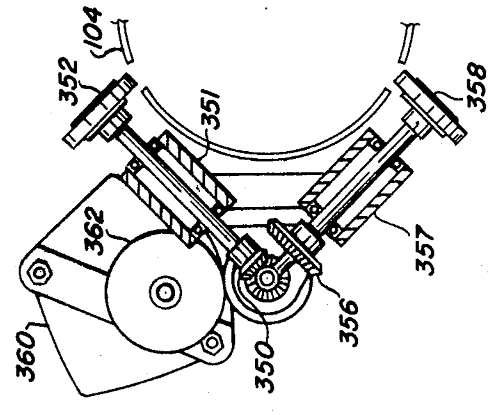
FIG. 4 is a front view through lines A–A of the stepping paper drive shown in FIG. 3.

FIG. 4 is a front view of the stepping paper drive in order to more fully show the relationship of the parts. Similar numbers are used in this figure for like apparatus. FIG. 4 is a section view of FIG. 3 taken through the lines A–A. Here can be seen the apparatus for the driving of the drive wheels 352 and 358. Thus, gear 350 through shaft arrangements 351 and associated bearings, etc., and likewise gear 356 through shaft arrangement 357 drives wheels 352 and 358, respectively.

Figure 5:
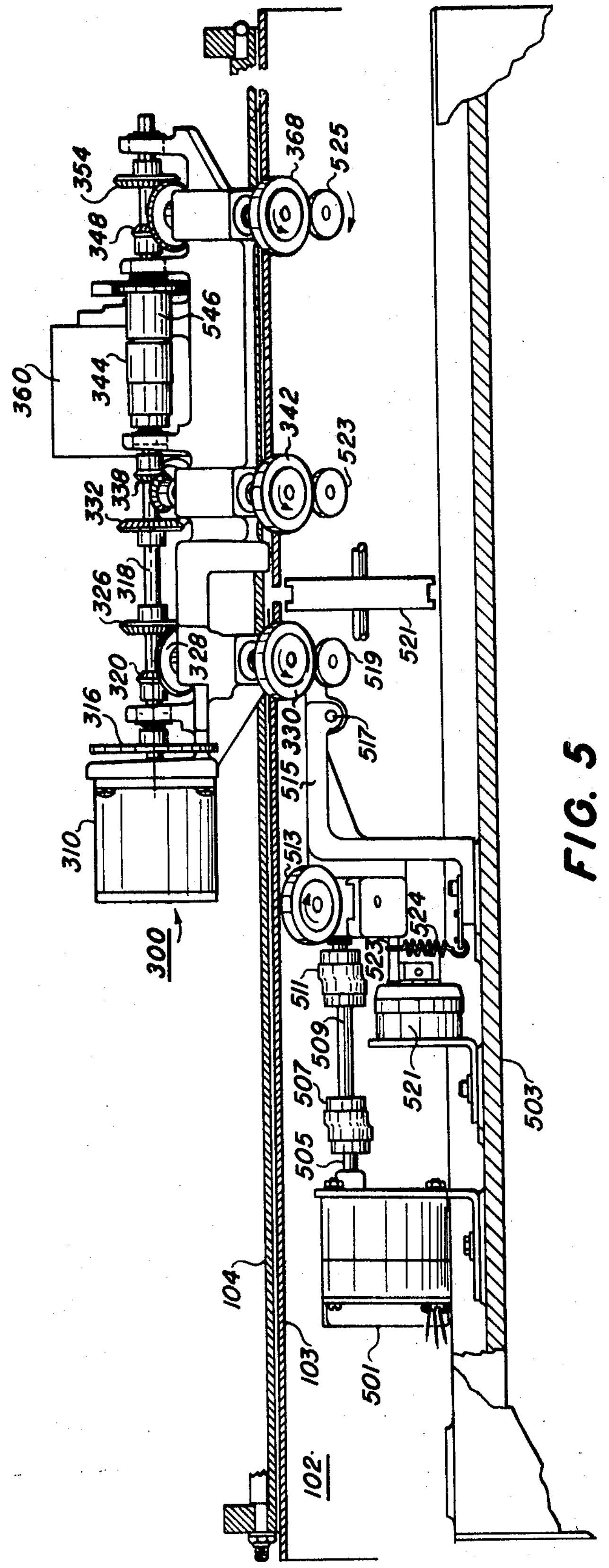
FIG. 5 is a drawing partly in section of the present invention utilizing the teeter-totter assembly, and the incremental stepping paper drive.

FIG. 5 shows the stepping paper drive assembly 300 mounted in relation to the platen assembly 102. The platen assembly itself is shown in cross section while the other components are shown in full side view in order to adequately show the relationship of the separate parts. As seen in this figure, motor 501 is mounted on a subsupport 503 by means of the usual brackets and supporting apparatus. The output shaft from the motor 505 is coupled to flexible coupling 507, which by shaft 509 is connected to a similar flexible coupling 511. The shaft from coupling 511 in turn drives wheel 513 and its opposing wheel not shown in this figure, which is mounted on one end of the teeter-totter arrangement 515. The teeter-totter arrangement 515 pivots around shaft 517 and causes idler wheel 519 to come into and out of contact with drive wheel 330, in addition to the opposing wheels not seen in this figure, but the relationship thereof can be seen in FIG. 6. Solenoid 521 upon command from the transceiver logic and control circuit 50 is operated and the output shaft therefrom is caused to turn, thereby moving shaft 523 in an upward or downward movement, depending upon the particular step the apparatus is in. This causes the teeter-totter arrangement 515 to revolve about shaft 517 thereby causing drive wheel 513 to come in contact with platen 102 and cause idler wheel 519 to come out of contact with drive wheel 330, and vice versa.

The document or copy paper, depending upon the mode in which the apparatus is operating, would be moved into position by the automatic paper feeder 200 as set forth in conjunction with the description of FIG. 2. The paper drive apparatus seen in FIG. 2 for moving the paper into proper position is not seen in FIG. 5 for purpose of clarity. Once the paper is in proper position, in a manner determined more fully hereinafter, the solenoid 521 is activated, causing wheel 513 to come in contact with the paper by forcing it against platen 104. This action causes the paper to move toward the right at a high rate of speed to the scan area. When it is determined that the document is in proper position for scanning, the solenoid 521 is caused to operate again and wheel 513 is moved away from platen 103 and idler wheel 519 comes in contact with idler wheel 330 through the document. The stepping action commences at this point by the action of stepping motor 310 as set forth above in conjunction with FIG. 3. The scanner is noted as 521 and may be any of the scanners as set forth above known in the prior art.

The document in the transmit mode and the copy paper in the receive mode is continually stepped by means of drive wheel 330 and idler wheel 519 until the document comes in contact with drive wheel 342 and idler wheel 523. At this point the stepping action is derived by the two drive wheels 330 and 342 and associated idler wheels 519 and 523. The scan action continues until the document reaches drive wheels 358 and idler wheel 525, continually stepping the document past the scan area 521. When the document is noted to be at a predetermined distance past the scan area 521, continuous drive motor 360 by means of clutch arrangement 346 drives drive wheel 358 at a high rate of speed to take the document away from the scan area at a higher rate of speed than the scan rate.

Figure 6:
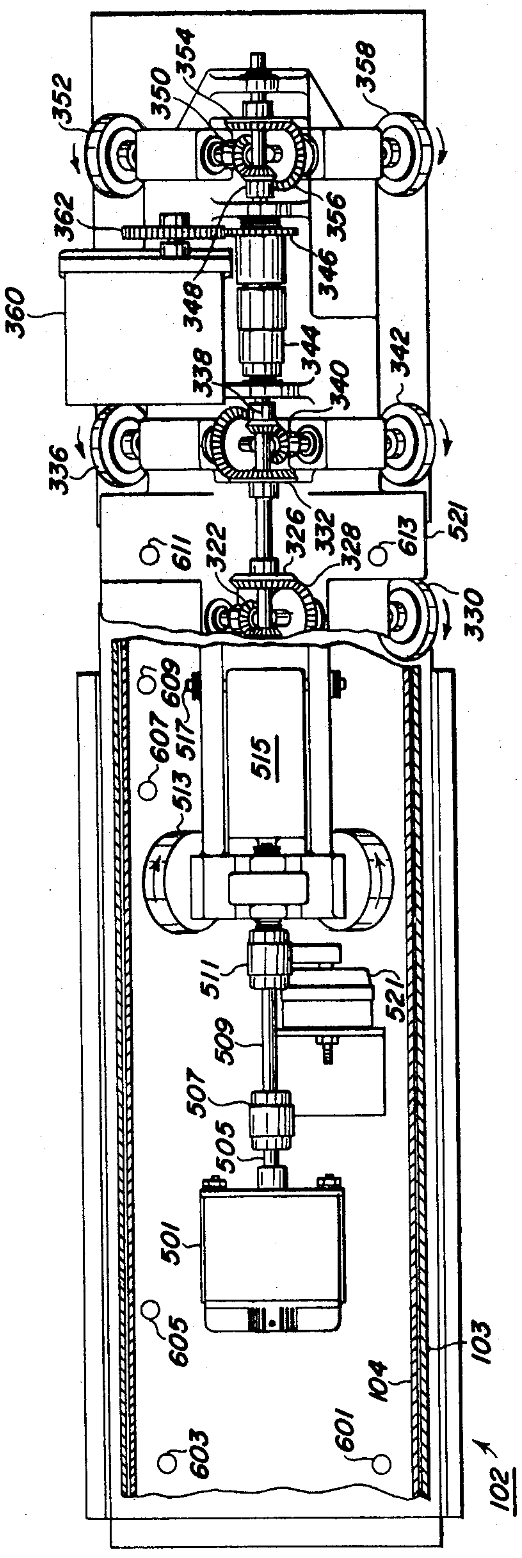
FIG. 6 is a top view of the teeter-totter assembly and the incremental stepping paper drive as seen in FIG. 5.

In FIG. 6 is shown a top view of the apparatus shown and described in conjunction with FIG. 5. In this figure can be seen the drive wheels 513 mounted on teeter-totter arrangement 515. It can be seen here that the wheels are offset at an angle so as to allow the document to be moved along the arcuate surface of the platen assembly 102. Schematically shown here are the photodetectors 601 to 613. They would be mounted accordingly on platens 103 and 104. Depending upon the method of automatic document feeding as set forth above in conjunction with FIG. 2, photodetectors 601 and 603 or photodetectors 605 or 607 will be in operation. If the document or copy paper is fed in an arcuate arrangement longitudinally onto the platen as described above, photodetectors 601 and 603 will detect the leading edge of the document or copy paper. This sets in motion a count sequence in the electronic circuitry in the transceiver logic and control circuit 50 which counts the time that the document should reach the scan area. If, however, the document is automatically fed into the apparatus of FIG. 6 in the manner shown in FIG. 2, then photodetectors 605 and 607 also mounted on platen assembly 102, to detect the leading edge of the document as it begins its curved path around platen 102 to reach the point where the document will be taken into the scanned area. In a similar manner, the notation of the leading edge of the document will commence the count action in logic and control circuit 50 upon which the document will reach its terminal position. At this time the teeter-totter arrangement 515 is energized by solenoid 521 and drive wheels 513 move upward, which in this figure is out of the page, to press the document against the platen 104 thereby driving it to the right of the figure at a high rate of speed.

When the document, being driven by drive wheels 513, reaches the scan area, photodetectors 611 and 613 detect the leading edge of the document, or copy paper depending upon the mode, which emits a signal to the control circuit which operates solenoid 521 again by causing drive wheels 513 to move out of contact with the document and the platen 104 around axis 517. This action causes idler wheels 519, seen in FIG. 5, to rise and come in contact with the leading edge of the document and drive wheels 330. The continuous feed drive motion is now out of the picture and the document is advanced past the scan area in a stepping action determined by stepping motor 310, in FIG. 5. As set forth above in FIG. 5, drive wheels 330, 342, 336, 352 and 358 advance the document along in a stepping manner while the scanning or printing action takes place. If, as set forth in conjunction with FIG. 1, the buffer, in the transmit or receive mode, is receiving information at a rate higher than it can handle, stepping motor 310 in FIG. 5 is interrupted and the stepping action, by means of the drive wheels seen in FIG. 6, is interrupted accordingly. Scanner rotation would continually take place, however, but the control circuit would prevent the subsequent video or print circuitry seen in FIG. 1 from operating in accordance with the detected or received information. When the trailing edge of the document or copy paper by the scan area 521 reaches photodetector 609, a similar counting action takes place which is predetermined to allow the document to clear the scan area after the trailing edge passes the photodetector. When the document has passed the photodetector 609, the scan area 521 and drive wheels 342 and 336, in accordance with the count determined by the control circuit 50, continuous drive motor 360, in a manner as set forth in conjunction with FIG. 3, drives wheels 352 and 358 at a high rate of speed, thereby taking the document away from the scan area at a rapid rate.

In the foregoing there have been disclosed methods and apparatus for incrementally stepping a document or record member in a buffer controlled scan facsimile transceiver system. A transceiver unit has been shown and described; however, it is apparent that separate transmitters and receivers may be utilized in conjunction with the present invention. Moreover, while the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation to the teaching of the invention without departing from its essential teachings.

We claim:

1. A paper drive system comprising:

inner and outer support surfaces in a spaced apart relationship to allow said paper to be moved therebetween, first drive means mounted on said inner support surface for rapidly advancing said paper to an operational area along the path of the movement thereof, second drive means mounted on said outer support surface for incrementally advancing said paper past said operational area, means for momentarily interrupting said second drive means in response to an external condition signal, and third drive means coupled to said second drive means for rapidly advancing said paper away from said operational area.

2. A paper drive system comprising:

inner and outer support surfaces in a spaced apart relationship to allow said paper to be moved therebetween, first drive means mounted on said inner support surface for rapidly advancing said paper to an operational area along the path of movement thereof, said first drive means comprising:

a support member pivotable about a central axis, said central axis being perpendicular to the direction of paper movement, drive wheel means mounted on the outer end of said support member extending through an aperture in said inner support surface to contact said outer support surface in a first state, idler wheel means mounted on the opposite end of said support member extending through an aperture in said inner support surface to contact said second drive means in a second state, means for detecting the leading edge of said paper at the operational area, said support member being in said first state to cause the driving wheel means to advance said paper to the operational area, whereby said detecting means detects the leading edge of said paper for pivoting said support means to bring said idler wheel means in contact with said second drive means to incrementally step said paper past the operational area, second drive means mounted on said outer support surface for incrementally advancing said paper past said operational area, and third drive means coupled to said second drive means for rapidly advancing said paper away from said operational area.

3. The paper drive system as set forth in claim 2 wherein said second drive means comprises second and third drive wheel means along the path of paper movement for incrementally advancing said paper past said operational area, said second drive wheel means operating in conjunction with said idler wheel means of said first drive means, and further including second means for detecting the lagging edge of said paper at said operational area, said third drive means comprising clutch means coupled to said third drive wheel means responsive to said second detecting means for transferring to said third drive wheel means a continuous drive motion at a rate in excess of said incremental advance, thereby rapidly moving said paper away from said operational area.

4. The paper drive system as set forth in claim 3 wherein said inner support means is separated into two sections defining said operational area for operation on said paper, and further including scanning means adjacently disposed from said operational area for scanning successive lines on said paper in a direction transverse to the path of movement of said paper past said operational area.

5. The paper drive system as set forth in claim 4 wherein said scanning means comprises a turret rotating through an axis longitudinal to said paper path movement, said turret including two optical read heads disposed 180° around the periphery of said turret for operation in a read mode, and two write heads disposed 180° around the periphery of said turret and 90° away from said read heads for operation in a write mode, and wherein said inner and outer support surfaces are cylindrically shaped with the axis of said cylinder being longitudinal to the path of paper movement and of radius to accommodate the arcuate path of said rotating turret.

6. In a system for handling paper or the like, an assembly for allowing different drive motions to be imparted to said paper, comprising a support member pivoted about a central axis, said axis being in the plane substantially defined by the paper movement, first drive means mounted on one pivotable end of said support member for imparting a first motion to said paper, second drive means mounted on the other pivotable end of said support member for imparting a second motion to said paper, and means coupled to said support member for pivoting said support member causing said first or second drive means, respectively, to impart said drive motions to said paper.

7. The assembly as set forth in claim 6 further including first motor means for driving said first drive means, flexible coupling means coupled to said motor means and said first drive means to allow the driving action while the support means is pivoted, and solenoid means coupled to said support means for pivoting said support means in response to external condition signals, 8. The assembly as set forth in claim 7 further including inner and outer support surfaces in a spaced apart relationship to allow said paper to be moved therebetween said first drive means extending through an aperture in said inner support surface to contact said outer support surface, said paper being driven between said drive means and said outer support surfaces.

9. The assembly as set forth in claim 8 further including third drive means mounted on said outer support surface and extending through adjacent apertures in said inner and outer support surfaces to actively drive said second drive means, second motor means coupled to said third means for driving said third drive means.

10. The assembly as set forth in claim 9 wherein said first motor means is a continuous drive motor for imparting a continuous drive to said paper, and wherein said second motor means is an incremental drive motor for imparting a stepping drive to said paper.

11. The assembly as set forth in claim 10 further including first paper detecting means for detecting the presence of paper at the location of said first drive means, said solenoid means being responsive to the output from said first detecting means for pivoting said support means, thereby engaging said first driving means with said paper and said outer support surface, and second paper detecting means for detecting the presence of said paper at the location of said second and third drive means, said solenoid means being responsive to the output from said second detecting means for pivoting said support means, thereby disengaging said first driving means, and engaging said second drive means with said third drive means.